2,848,312

COMPOSITION CONTAINING 2-METHYL PENTANEDIOL-2,4 HYDROGEN BORATE AND BIS-(2-METHYL PENTANEDIOL-2,4) DIBORATE

Chien-wei Liao, Cleveland, Ohio, assignor to The Standard Oil Company, Cleveland, Ohio, a corporation of Ohio No Drawing. Application October 4, 1956
Serial No. 613,843

2 Claims. (Cl. 44—63)

This invention relates to a novel composition consisting essentially of 2-methyl pentanediol-2,4 hydrogen borate and bis-(2-methyl pentanediol-2,4) diborate which is liquid at temperatures as low as −15° F.

It is now known that certain organic boron compounds are advantageous in liquid leaded motor fuels. The boron has an advantageous effect on power output, which is attributed to inhibition of spark plug fouling, gives a significant reduction in octane requirement increase, reduces combustion chamber deposits, may significantly improve oil and gasoline mileage, and may reduce wear. Boron-containing leaded motor fuels are now in commercial use, and have been well received by the public. Two compounds which have been used to introduce boron into the fuel are 2-methyl pentanediol-2,4 hydrogen borate and bis-(2-methyl pentanediol-2,4) diborate.

For blending purposes with the fuel it is, of course, desirable to have the boron compound in liquid form, because it can then be pumped and metered in for blending. Slurries and solids cannot be handled in this way. 2-methyl pentanediol-2,4 hydrogen borate is a solid with limited solubility in organic solvents. Bis-(2-methyl pentanediol-2,4) diborate is a liquid which is miscible in gasoline and the common organic solvents in all proportions. It is, however, difficult to prepare, inasmuch as the water must be removed azeotropically in order to obtain the pure anhydride. Unless more than 75% of the product is anhydride, the ester remaining is insoluble and a solvent is needed to make the product a homogeneous solution.

In accordance with the invention, it has been determined that a mixture of 2-methyl pentanediol-2,4 hydrogen borate, in the amount of 5 to 15%, with from 85 to 95% bis-(2-methyl pentanediol-2,4) diborate, is fluid and homogeneous at temperatures from −15° F. to 40° F., depending upon the amount of 2-methyl pentanediol-2,4 hydrogen borate. Thus, this mixture can be handled readily in a blending plant for addition to the gasoline by pumping and metering.

The blend in accordance with the invention can be prepared synthetically by mixing 2-methyl pentanediol-2,4 hydrogen borate with the bis-(2-methyl pentanediol-2,4) diborate in the desired proportions. The blend of the invention also can be prepared directly from the starting materials, boric acid and 2-methyl-2,4-pentanediol, in a 1:1 molar ratio, because the reaction can be so controlled as to produce the desired blend of these two boron compounds. It is suggested that this occurs because in the course of the reaction the major proportion of the 2-methyl pentanediol-2,4 hydrogen borate which is formed is converted into the bis-(2-methyl pentanediol-2,4) diborate by heat dehydration. Thus, by sufficient heating, over 85% of the bis-(2-methyl pentanediol-2,4) diborate can be obtained.

The reactions are thought to proceed as follows:

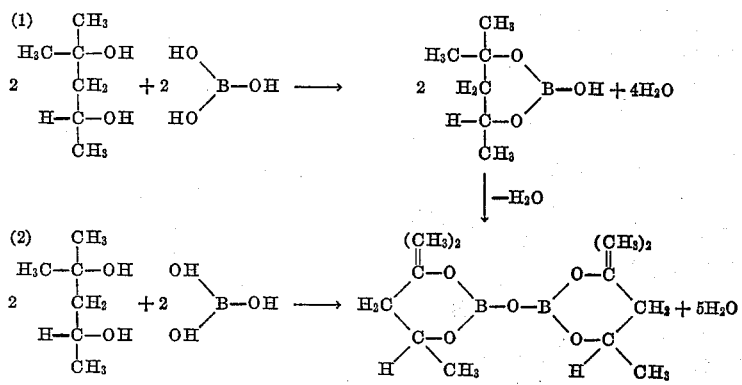

In this procedure, the progress of the reaction is followed closely, and when the proportion of the 2-methyl pentanediol-2,4 hydrogen borate has dropped to below 15%, the reaction can be halted.

The following example will illustrate the procedure:

EXAMPLE 1

10,887 pounds of boric oxide, 290 pounds of water and 37,648 pounds of 2-methyl-2,4-pentanediol (a 1:1 molar ratio) were charged to a mixer tank and heated to 204° F. Reaction was continued with mixing for 69 hours. Heat liberated from the reaction increased the temperature during the first 25 hours to 214° F. and the temperature throughout the reaction time ranged from 237 to 239° F. At the end of this time the reaction mixture showed, by analysis, 5,712 pounds of 2-methyl pentanediol-2,4 hydrogen borate and 32,452 pounds of the bis-(2-methyl pentanediol-2,4) diborate. 1,353 pounds of the pentanediol had not reacted. Thus, the mixture contained 15% of the 2-methyl pentanediol-2,4 hydrogen borate and 85% bis-(2-methyl pentanediol-2,4) diborate.

The product was a fluid and when stored under nitrogen at various temperatures and for various times gave the following results:

Table I

*Procedure.*—100 ml. of additive placed in 4 oz. bottle under nitrogen blanket. All work done in duplicate at 23° F., 40° F., 75° F., and 110° F.

| Storage Temperature | Time for Initial Crystals to Appear [1] | Remarks |
|---|---|---|
| 110° F | | No crystals after 1 month storage. |
| 75° F. (Room Temperature). | | Do. |
| 40° F | 24 hours | ½″ of crystals in 48 hours. |
| 23° F | 2½ hours | ½″ of crystals in 24 hours. |

[1] All samples were seeded with dry rock.

It is apparent that the product is sufficiently homogeneous and stable for use in blending in a plant at temperatures above 40° F.

EXAMPLE 2

The above example illustrates the preparation of a blend in accordance with the invention, directly from the starting materials. A series of blends were prepared synthetically, using pure 2-methyl pentanediol-2,4 hydrogen borate, and pure bis-(2-methyl pentanediol-2,4) diborate, prepared in accordance with the following procedures:

A 320 grams of dry boric acid and 620 grams of 2-methyl-2,4-pentanediol (a 1:1 molar ratio) were mixed together. Upon mixing, the temperature dropped approximately 8 to 10° C., and upon additional stirring, the temperature then rose rapidly to and slightly above the initial temperature, at which time the mixture became solid. The mixture was then heated and became completely liquid at about 70 to 75° C. Upon cooling, a solid was formed which was separated from the aqueous mother liquor. A crystalline product was recrystallized twice from straight-run naphtha (a hydrocarbon having a boiling range of 43 to 127° C.) and once from normal heptane. The product, 2-methyl pentanediol-2,4 hydrogen borate, was a white crystalline solid and had a melting point of 74 to 76° C.

B 49.5 grams of dry orthoboric acid and 94.5 grams of 2-methyl-2,4-pentanediol (a 1:1 molar ratio) were mixed together. Upon mixing, the temperature dropped approximately 8 to 10° C., and upon additional stirring, the temperature then rose rapidly to and slightly above the initial temperature, at which time the mixture became solid. The mixture was then heated and became completely liquid at about 70 to 75° C. 100 cc. of benzene was added and the water formed was removed azeotropically by distillation with the benzene over a period of several hours. The product, bis-(2-methyl pentanediol-2,4) diborate, was a colorless liquid of medium viscosity and had a boiling point of approximately 275° C. at atmospheric pressure and 140 to 142° C. at 1 mm. Hg.

Six blends were prepared in various proportions, and the physical appearance of the mixtures determined at 75° F., 40° F., 0° F., and −15° F. The following results were obtained.

It is apparent from the above results that compositions containing less than 10% of the 2-methyl pentanediol-2,4 hydrogen borate are homogeneous down to −15° F. Compositions containing 10% 2-methyl pentanediol-2,4 hydrogen borate are homogeneous down to 0° F., and those containing 15% homogeneous down to 40° F. Compositions containing more than 15% 2-methyl pentanediol-2,4 hydrogen borate are heterogeneous even at 75° F. Thus, if homogeneity at very low temperatures is required, it is desirable to have less than 10% of the 2-methyl pentanediol-2,4 hydrogen borate.

A small amount of the 15–85% composition, sample No. 4, was blended with aviation mix gasoline [1] in an amount to furnish 0.02% boron, the gasoline divided into four parts, and these stored at 75° F. and 0° F., under dry and moist conditions, in comparison with a gasoline control and a gasoline containing a 3% solution of 2-methyl pentanediol-2,4 hydrogen borate (or solution in toluene) to furnish 0.02% boron.

Each of the test compositions was as clear as the control. The composition of the invention gave as good a solution in gasoline as the toluene solution.

The gasoline compositions tried are proven, known compositions regularly used as fuels for automobile engines. The composition of the invention also has been used as a fuel for such engines, and has shown itself the equal of the gasoline containing the toluene solution in every respect in this use.

It is evident from the above that the composition of the invention is useful in the same way as is each of its known individual components to furnish boron to motor gasoline fuels.

The gasoline base stocks to which the boron compounds are added may be any of those conventionally used in making motor gasoline (gasoline for use in an automobile), but preferably should be clean burning, for example, with a General Motors sludge number not over 50. This would exclude large amounts of thermally cracked stocks and olefin polymers.

The gasoline may also contain tetraethyl lead in amounts up to 6 cc. but usually from ½ cc. to 3 cc. per gallon, and a scavenging agent. The latter may be 1 theory of ethylene dichloride and ½ theory of ethylene dibromide (the so-called "motor mix" or MM) or 1 theory of ethylene dibromide, the so-called "aviation mix" or AM. By "theory" is meant the stoichiometric amount of the ethylene dihalide for combination with all of the lead as lead halide. The AM is preferred since in combination with the boron compound there results a better overall effect in engine performance. The gasoline may contain any of the usual adjuncts such as antioxidants, dyes, solvent oils, alcohols, etc.

The amount of the boron compound added to the fuel may vary, and the amount is preferably expressed in terms

[1] Aviation mix gasoline fuel, containing 3 cc. tetraethyl lead per gallon and 1 theory of ethylene dibromide, in a motor gasoline base composed of a mixture of straight-run naphtha and catalytic distillate in a ratio of 1 : 3; the fuel had an octane number of 94.

*Table II.—Low-temperature storage stabilities of mixtures*

| | Sample Number | | | | | |
|---|---|---|---|---|---|---|
| | 1 | 2 | 3 | 4 | 5 | 6 |
| Composition: | | | | | | |
| Percent bis-(2-methyl pentanediol-2,4) diborate | 100 | 95 | 90 | 85 | 82 | 80 |
| Percent 2-methyl pentanediol-2,4 hydrogen borate | 0 | 5 | 10 | 15 | 18 | 20 |
| Physical Appearance: | | | | | | |
| 75° F | Homo. | Homo. | Homo. | Homo. | Hetero. | Hetero. |
| 40° F | Homo. | Homo. | Homo. | Homo. | Hetero. | Hetero. |
| 0° F | Homo. | Homo. | Homo. | Hetero. | Hetero. | Hetero. |
| −15° F | Homo. | Homo. | Hetero. | Hetero. | | Hetero. |

Homo.=homogeneous.    Hetero.=heterogeneous.

of % boron. Generally, an amount of the compound to provide 0.002% by weight of boron (based on the total fuel) is the smallest amount that will give any significant effect. Amounts between 0.004% and 0.008% by weight are preferred. Use of amounts in excess of 0.1% usually cannot be justified economically.

Gasolines containing the boron composition of the invention give a significant reduction in octane requirement increase, appreciably lessen combustion chamber deposits, improve the operation of gasoline combustion engines by reducing pre-ignition, reduce wear as evidenced by valve channelling, improve oil mileage and increase gasoline mileage.

The composition of the invention is believed to be a solution of the solid 2-methyl pentanediol-2,4 hydrogen borate in the liquid bis-(2-methyl pentanediol-2,4) diborate. At proportions above 15%, apparently the former exceeds its solubility in the latter at all temperatures of 110° F. and below. At the lower temperatures, the solubility of the former is decreased, and this explains why only solutions of less than 10% are homogeneous below 0° F.

All percentages in the specification and claims are by weight.

I claim:
1. A fuel additive composition consisting essentially of from 5 to 15% solid 2-methyl pentanediol-2,4 hydrogen borate and an amount within the range from 95 to 85% liquid bis-(2-methyl pentanediol-2,4) diborate to dissolve the solid hydrogen borate and maintain the composition homogeneous and fluid at least down to 40° F.
2. A fuel additive composition consisting essentially of from 5 to 10% solid 2-methyl pentanediol-2,4 hydrogen borate and an amount within the range from 95 to 90% liquid bis-(2-methyl pentanediol-2,4) diborate to dissolve the solid hydrogen borate and maintain the composition homogeneous and fluid at least down to 0° F.

References Cited in the file of this patent

UNITED STATES PATENTS

| | | |
|---|---|---|
| 2,741,548 | Darling et al. | Apr. 10, 1956 |
| 2,767,069 | Fay et al. | Oct. 16, 1956 |

FOREIGN PATENTS

| | | |
|---|---|---|
| 1,074,952 | France | Oct. 11, 1954 |

UNITED STATES PATENT OFFICE
CERTIFICATE OF CORRECTION

Patent No. 2,848,312                              August 19, 1958

Chien-wei Liao

It is hereby certified that error appears in the printed specification of the above numbered patent requiring correction and that the said Letters Patent should read as corrected below.

Column 2, line 56, for "237 to 239° F." read -- 237 to 329° F. --.

Signed and sealed this 11th day of November 1958.

(SEAL)

Attest:
KARL H. AXLINE
Attesting Officer

ROBERT C. WATSON
Commissioner of Patent